United States Patent
Allard et al.

(10) Patent No.: US 7,182,874 B2
(45) Date of Patent: Feb. 27, 2007

(54) STORM WATER TREATMENT APPARATUS EMPLOYING DUAL VORTEX SEPARATORS

(75) Inventors: Douglas Paul Allard, Santa Rosa, CA (US); Jonathan McDonald, Ramona, CA (US)

(73) Assignee: KriStar Enterprises, Inc., Santa Rosa, CA (US)

( * ) Notice: Subject to any disclaimer, the term of this patent is extended or adjusted under 35 U.S.C. 154(b) by 114 days.

(21) Appl. No.: 11/044,482

(22) Filed: Jan. 27, 2005

(65) Prior Publication Data

US 2005/0184007 A1 Aug. 25, 2005

Related U.S. Application Data

(60) Provisional application No. 60/614,598, filed on Sep. 29, 2004, provisional application No. 60/546,623, filed on Feb. 20, 2004.

(51) Int. Cl.
*B01D 21/02* (2006.01)
*B01D 21/26* (2006.01)
*C02F 1/00* (2006.01)
*C02F 1/38* (2006.01)

(52) U.S. Cl. .................... 210/788; 210/787; 210/800; 210/801; 210/802; 210/806; 210/170; 210/512.1; 210/512.2; 210/532; 210/538

(58) Field of Classification Search ............... 210/787, 210/788, 800, 801, 802, 806, 170, 512.1, 210/512.2, 532, 538
See application file for complete search history.

(56) References Cited

U.S. PATENT DOCUMENTS

| | | | |
|---|---|---|---|
| 4,985,148 A | 1/1991 | Monteith | |
| 5,498,331 A | 3/1996 | Monteith | |
| 6,730,222 B1 * | 5/2004 | Andoh et al. | 210/512.1 |
| 6,951,619 B2 * | 10/2005 | Bryant | 210/788 |

* cited by examiner

*Primary Examiner*—David A. Reifsnyder
(74) *Attorney, Agent, or Firm*—Howrey LLP (57) ABSTRACT

A stormwater treatment device for removing floatables, solids and suspended particles and the like from stormwater run off, whereby a removable assembly is provided for installation into a manhole basin, the assembly including a pass-through member which receives stormwater from an incoming drainage system, and diverts low flows to at least one or more vortex separators, while allowing for high flows to bypass the separators and flow through the assembly untreated to exit the basin without diversion.

18 Claims, 9 Drawing Sheets

STORM WATER TREATMENT APPARATUS EMPLOYING DUAL VORTEX SEPARATORS

This application claims benefit of Provisional Patent Application Ser. No. 60/546,623 filed Feb. 20, 2004 and Provisional Patent Application Ser. No. 60/614,598 filed Sep. 29, 2004, both of which applications are incorporated herein by reference.

BACKGROUND OF THE INVENTION

1. Field of the Invention

Embodiments of the present invention generally relate to methods and apparatus for treatment of stormwater runoff, and more particularly to a stormwater treatment system employing dual vortex separators for removing debris and suspended particles from such stormwater runoff.

2. Description of the Related Art

Drainage systems for receiving fluid flow are well known in the art. Such systems provide a path for fluid flow from surface areas and often transport the fluid from surface areas directly to the ocean, rivers, lakes, estuaries, streams and the like without regard to the removal of debris, pollutants or other contaminants. For example, because of the Federal Environmental Protection Agency's Clean Water Act, controlling pollution from stormwater runoff is receiving ever-increasing attention at all levels of government, Federal, State and local. Federal and state agencies have issued mandates and developed guidelines regarding the prevention of non-point source (stormwater caused) pollution that require local government action.

Because of the aforementioned mandates, many cities and special districts have developed plans and taken steps to prevent stormwater pollution. These actions range from those that are educational in nature (labeling stormwater inlets with phrases such as "No dumping—Flows into Rivers and Streams") to active measures to remove pollutants. Such measures generally require the installation of equipment for removing contaminants somewhere between where the stormwater enters the drainage system and the ultimate body of water receiving the runoff.

Several types of equipment are employed to reduce pollution and contaminants from stormwater runoff. Catch basin filtration systems use devices installed at the point that the stormwater enters the drainage system. The water flow is directed through an installed adsorbent material that aids in removing contaminants from the stormwater while allowing the water to flow into the drainage system. Such a permanently installed catch basin filtration system is disclosed in U.S. Pat. No. 5,720,574. In addition to catch basin filtration systems, oil/water separators have been employed. Such systems generally comprise large underground holding tanks that allow pollutants to settle in the tank and the water to flow into the drainage system. Other systems also exist to remove contaminants from water runoff. However, these systems are also generally permanent installations that are expensive to install and maintain.

Moreover, because such filtration systems typically require regular maintenance, issues arise such as ease of access and the length of time that a system can operate between cleaning or replacing filter elements or other parts. Access to elements that must be cleaned or replaced is problematic in some systems, such that a heightened burden is placed on those who regularly maintain these systems. In addition, silt, sediment and other debris tend to settle on or around filter elements in many filtration systems, such that the length of time that these elements can effectively filter stormwater runoff can be significantly reduced.

Another significant problem that has emerged in the development of catch basin filtration systems is the ability of such systems to process large quantities of fluid during peak flow periods without having backups or stoppages that result in localized flooding of surrounding areas. Peak flow periods would include, for example, extreme storm conditions or other flood type events. Due to concerns over storm drainage backups that can result in localized flooding, many filtration systems must employ some form of a high-flow bypass feature that allows excess fluids to proceed through the drainage system without being filtered during such high flow periods. As a result, these types of filtration systems have an upper limit as to the amount of fluid that can be filtered at any given time as well as a maximum capacity for the amount of fluid that can be passed through the system in any event.

As an alternative to, or in combination with use of inlet catch basins, it has been suggested to direct flows of stormwater runoff to larger, downstream structures, i.e., catch basins or manholes, accessible by manhole cover, into which some sort of treatment apparatus has been placed. In association with use of these larger basins, it has been proposed to use a hydrodynamic separation unit, these types of separators well known for wastewater treatment, to remove suspended particles from runoff. However, the units currently available require custom installation, and like the inlet catch basin filtration systems earlier described, require periodic maintenance to remove accumulated sludge and debris. Because of the configuration and lack of portability of these units, they do not allow for easy cleaning of the manhole into which they have been placed.

SUMMARY OF THE INVENTION

The present invention generally relates to a novel, in-line hydrodynamic filtration system for stormwater runoff in which dual vortex separators are used to remove sediments from runoff. The separators are designed to function in stages, to treat the lowest flows in one separator, with diversion of increasing flows to a second separator. At peak flow, an in-line bypass allows such excess flow to pass through the filtration system, thereby preventing backup of stormwater, while at the same time leaving accumulated materials undisturbed.

By way of this invention, a removable assembly unit is provided including a directional pass-through member, at least one vortex separator positioned to each side of the pass-through member, with a separate passageway or inlet extending from the wall of the pass-through member to the wall of each of the separators. The passageways direct the flow of fluids tangentially to the inner wall of the separator to impart a downwardly spiraling, vortex type flow to the introduced water. In one embodiment, the pass-through member is a closed wall through-pipe. In another embodiment, the pass-through member comprises an open-top bypass chute, as will be more fully described hereinafter.

The vortex separators themselves may comprise cylindrical tubes, extending downwardly from the pass-through member through a central platform, to a debris holding reservoir below the platform. A first weir disposed internal to the pass-through member at its base directs the initial, low flow to the first passageway, carrying first flow stormwater to the first of the at least two vortex separators, each oriented vertically relative to the through-pipe. That is, the central, longitudinal axis of each separator is disposed substantially orthogonally relative to the longitudinal axis of the through-pipe. A second weir, disposed within the pass-through member downstream from, and taller than the first weir, directs overflow from the first weir to a second transport passageway to carry this second stage flow to the second, vertically oriented vortex separator.

In most cases, the flows are directed to either the first or second separator for treatment. When flows from storm runoff increase beyond the capacity of the two separators, water will flow over the second weir, thereby continuing through the assembly to exit into the storm drain system for later discharge or treatment. It is preferred that the capacity of the pass-through member be equal to or larger than that of the drainage pipe supplying the system, to prevent the possibility of backup. Having such an inline, high flow capability, the need for a secondary unit, or placement of the unit offline, to accommodate a condition of high flow is eliminated.

As important as treatment capability is, it is also vital that treatment units be easily maintainable, and provide access to allow for complete cleanout. In the embodiment wherein the pass-through member comprises a closed wall through-pipe, the through-pipe is provided with an opening at its top to permit access to the weirs disposed there-within. Such allows for visual inspection of weirs and access for necessary cleanout to assure debris, which could block flow to either of the vortex separators, or over the second weir to outfall the unit, is not allowed to accumulate. In the embodiment where the pass-through member comprises an open-top bypass chute, inherent in this design is the providing of full access to the weir structures for easy inspection and cleanout. As a further feature of either embodiment, the treatment unit can be provided as an integrated assembly which can be easily disconnected from the walls of the basin into which it has been secured, and sized to be completely removed from the manhole via the manhole cover, thus allowing full access to all areas of the basin for cleaning and removal of accumulated sludge and debris.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The separator assembly of the present invention will now first be described with reference to the embodiment of FIGS. 1 through 4. The separator assembly 1 is shown in position above a manhole basin 3, connected to an inlet pipe 4 and an outlet pipe 5. The manhole basin is typically cylindrical in shape, having a smooth inner wall 6, a bottom floor 7, and a top, which is provided with an openable manhole cover 8, for allowing access to the basin. Inlet opening 9 is sized to receive a drain pipe carrying stormwater from one of more drains. The inlet is usually spaced at least one full equivalent manhole diameter distant from base 7 of the manhole. Typically, for the 4 foot diameter manhole illustrated in the figures, the inlet pipe will have a maximum diameter of 12 inches. For standard 5 and 6 foot diameter manholes, the inlet pipes are sized to a maximum of 18" and 24", respectively. Outlet opening 9' in the wall of the manhole is positioned opposite to and somewhat below inlet opening 9 to provide a straight path through the manhole. A pass-through member, in this case a closed wall through-pipe 10 is provided having an inlet end 11 and an outlet end 12, these ends aligned with inlet opening 9 and outlet opening 9', to direct fluid flow across the manhole.

The outlet opening is vertically displaced below the inlet opening a distance sufficient to provide the minimum fall required to assure gravity flow through the unit, from inlet to outlet, overcoming maximum head loss from flow over the diversion weirs and through the separator apparatus. It is this elevation drop between the inlet and outlet that provides in part the driving force to move water through the separator at the intended design flow rates, based on Manning's formula and applicable weir design calculations.

Central platform floor 13 generally separates the manhole volume into two zones, an upper open zone 14 and a lower, or reservoir zone 15, the vortex separators discharging into the lower zone which, as shown, comprises about half of the functional volume of the manhole, and serves as a retention basin for removed solids. The perimeter of platform 13, sized to seal against inner wall 6 of the manhole, is truncated at its upstream end to define a crescent like opening 16, said opening bounded by the truncated edge or flat of platform 13 and inner wall 6. Through opening 16, water which has traversed the vortex separators is allowed to flow back up over the top of forward baffle 26, positioned at the truncated end of central platform 13, into a storage compartment 27, the compartment bounded by baffle 26, platform 13, manhole sidewall 6 and retention baffle 28. There, above the platform, within storage compartment 27, floating debris which has been carried with the stormwater into the vortex separators will overflow through the open top of the separators where the debris is collected and retained. Stormwater entering compartment 27 exits the compartment through underflow opening 29 in retention baffle 28 to free space 14, to then exit the manhole through outlet opening 9'.

Vortex separators 30 and 31 are mirror images of each other and provided in fluid communication with through-pipe 10. Their diameters should be selected to fit within the confines of the manhole, yet small enough to be able to be removed through the associated manhole cover (not shown). The separators are defined by cylindrical tubes, open at each end and connected via tangential delivery tubes 32A and 32B at their upper portion to through-pipe 10, said tubes defining a transport passageway for carrying water to the separators. The tangential delivery tubes themselves are angled downwardly such that they meet the wall of the separator with their low point at the same level or lower than the invert bottom of the pass-through member. By so angling tubes 32A and 32B, drainage of the system during periods of low flow is facilitated. The separators may be supported in part at a lower position where they connect to and extend through central platform 13. The length of each tube is selected so as to project a substantial distance into lower zone 15, providing a zone in which settleable particle velocities are reduced, while at the same time project above the top of tangential delivery tube 32. In the illustrated embodiment of the figures, the tube extends slightly more than half way into lower zone 15 of manhole 3. At their top, the vortex separators are terminated at, or slightly below the height of the second, bypass weir, to allow floating debris retained at the top of the separators to overflow into storage compartment 27 during conditions of high, or bypass flow.

The vortex units function as hydrodynamic separators which, by definition, create long flow paths over small lineal distances. The providing of an extended flow path is achieved by the directing of flow in a circular or corkscrew like manner along the inner walls of the separator downwardly towards the bottom of reservoir 15. The longer the flow path, the longer the residence time afforded for solids to come out of suspension. On the one hand, for a given flow rate, the larger the diameter of the separator the longer the residence time allowed for particle sedimentation. On the other hand, the smaller the diameter of the separator, the faster the generated flow within the separator, and the shorter the distance to the side wall where deposition may occur. Thus, for such smaller diameter separators, larger centrifugal forces are created to act upon the suspended solids, bringing them out of suspension that much more rapidly. These competing considerations must be balanced when designing the separator units, taking into account the capacity of the delivery pathways, and the overall allowable dimensions of the assembly unit which permit removal through a standard sized manhole cover. An optimum ratio of separator diameter to tangential delivery tube diameter of between 3/1 to 4/1 is ideally maintained, while allowing adequate room for passage of potential floating debris through the tangential chute without clogging, and achievement of sufficient particle settling velocities and removal at the design flow rates.

The height of first or forward weir 34 is selected to allow for a predetermined maximum stormwater flow to enter first separator unit 30 through tangential delivery tube 32A. All flows below this maximum are directed by weir 34 to first separator 30. Flow capacity is limited by weir height and length as well as tangential delivery tube diameter and slope. In the usual case, the diameter of the tangential delivery tube is selected so as to match to the diversion capacity of the weir. As flow increases beyond the capacity of the first separator, water will spill over weir 34 where it will be backed up by second weir 36 and directed via tangential delivery tube 32B to the second separator 31. Vortex separator 31 is designed to act in much the same fashion as first separator 30 to remove suspended particles in the same manner.

For simplicity of fabrication, though not required, the second separator can be sized to be identical to the first. Further, second weir 36 can be sized so as to be capable of redirecting a volume of flow to the second separator equal to that directed to the first separator. Thus, in one embodiment, maximum first and second stage flows can be designed to be equal, though equal flows are not required for functional operation of the system.

It should be appreciated that certain advantages are achieved by sequencing the flows into a first and second vortex separator, which is not achievable using a single separator of larger diameter to accommodate a similar maximum flow. In dividing the flow between two vortex separators, smaller tubes can be used, which in turn results in the generation of greater centrifugal forces to act against suspended solids to enhance separation. This is especially important for the condition of low, first stage flow which often carries the bulk of pollutants and debris. For these low flow conditions it is preferred to tighten the circular separator path as much as possible so as to maximize the generated g-forces available to bring solids out of suspension.

The driving force for directing the flow of stormwater downwardly through the separators is provided by the hydrostatic head created by the geometry of the system, which in part is a function of the vertical distance between the inlet and outlet water surface elevations. This water surface elevation differential may be generated by a difference in inlet and outlet pipe invert elevations, development of hydrostatic head due to water backed up behind the diversion weirs, or a combination thereof. The greater the elevation difference, the greater the generated hydrostatic head. In the exemplary case of a 4 foot manhole, the minimum necessary vertical drop across the manhole will be in the order of about half an inch or so. The driving head may also be affected by the outlet pipe size and slope.

In the case of very high flows which overspill second weir 36, stormwater will continue through the through-pipe 10 to exit at outlet 9'. The diameter of the through-pipe is selected such that it is sufficient to accommodate the maximum possible flow past the second weir. At a minimum, its diameter will be at least the diameter of the inlet drain pipe delivering stormwater to the unit. To assure sufficient carrying capacity, through-pipe 10 is preferably sized larger than the inlet pipe. It need not be so large, however, that the cross sectional area of the opening defined between the crest of the second weir and the inner wall of the through-pipe exceeds the cross sectional area of the inlet line. In one embodiment, the combined cross sectional area of the second weir and of the opening defined by the crest of the second weir and the wall of the through-pipe is at least as large as the cross sectional area of the drainpipe to which the basin is connected.

The separator assembly at its inlet end is secured by inlet flange 38 to wall 6 of the manhole, rearward of opening 9. In another embodiment, not shown, a mounting flange can be provided separate from through-pipe 10 as a single or two half shell sections. The lower half shell section can be secured to interior wall 6 of manhole 3. With the separator assembly positioned within the manhole, the inlet end of the through-pipe will be received by the lower half shell of the mounting flange. The top section of the mounting flange, when used, can then be positioned over and releaseably joined to the bottom section to secure the one end of the separator assembly in place.

On the opposite side of the separator assembly, mounting rails 40 (FIG. 4) can be affixed to rearward retention baffle 28 along its vertical edges to abut inner wall 6 of the manhole, with the assembly positioned within the manhole, along with means for releaseably securing the unit to the inner wall of the manhole, thus securing the assembly in place. If desired, similar mounting rails 42 can be affixed to forward baffle 26, and a circular support flange 43 (FIG. 4) be further provided along with securing means to lock the assembly in place within the manhole.

Notably, as illustrated, through-pipe 10 terminates at an opening in the wall of retention baffle 28 so as to be in fluid communication with the rest of the chamber. Underflow opening 29 at the base of baffle 28 provides an outlet passageway for water which has overflowed forward baffle 26, to enter the free space on the other side of the baffle for exit from the manhole. By designing the assembly to be detachably secured to the walls of the manhole, it may later be readily disengaged and removed. In removing the assembly, the entire interior of the manhole becomes accessible, thus facilitating complete cleanout during routine maintenance.

In order to assure that the separator assembly may be fully removed from the manhole for its servicing and cleanout, the size of the assembly at its largest overall lateral dimension in the plane of platform 13 must be smaller than 4 feet, the standard manhole cover size. The assembly can also be provided with lift rungs (not shown) sized to receive cabled hooks to allow for the lifting of the assembly from the manhole through the manhole opening prior to cleanout. In the case of the illustrated four foot manhole, the assembly can be provided as a single unit as shown. For 5 foot and larger diameter manholes, where the largest dimension of platform 13 will be roughly equal to the diameter of the manhole into which it is placed to assure proper sealing, it is necessary for removal purposes to divide the assembly into two or more modular components.

Figure 1:
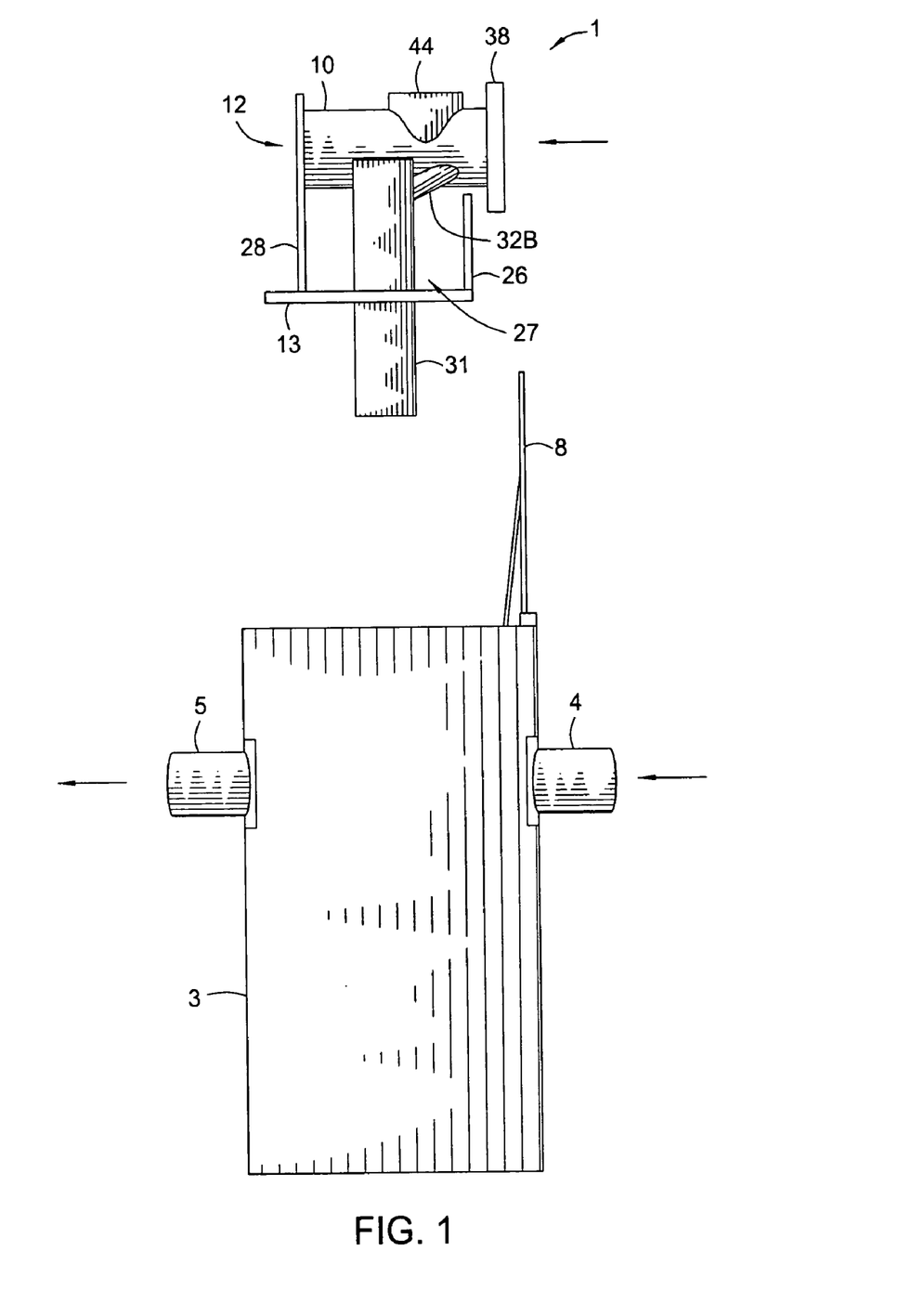
FIG. 1 is an exploded, three dimensional side view of a manhole with the treatment assembly of this invention removed.
Figure 2:
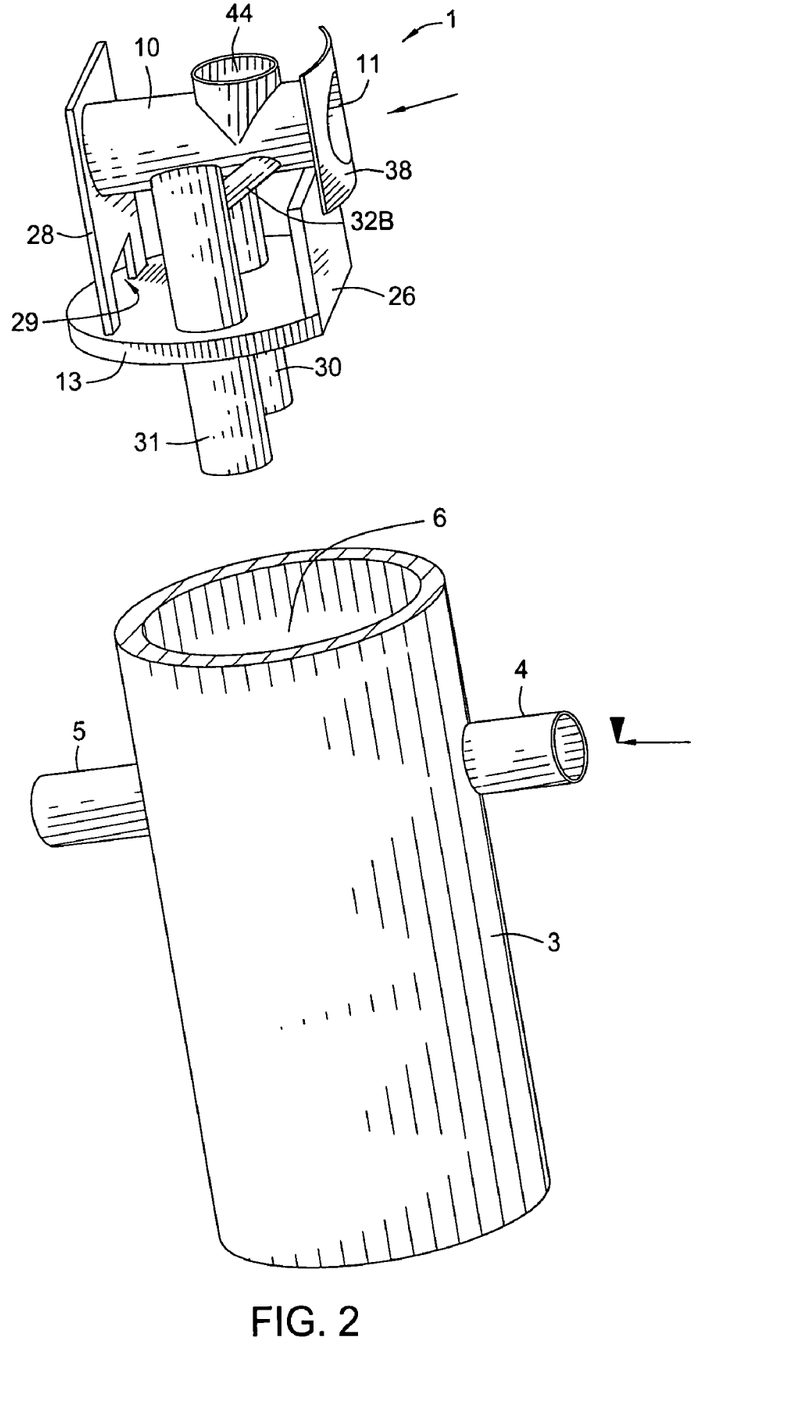
FIG. 2 is a rotated, exploded three dimensional view of the assembly of FIG. 1.
Figure 3:
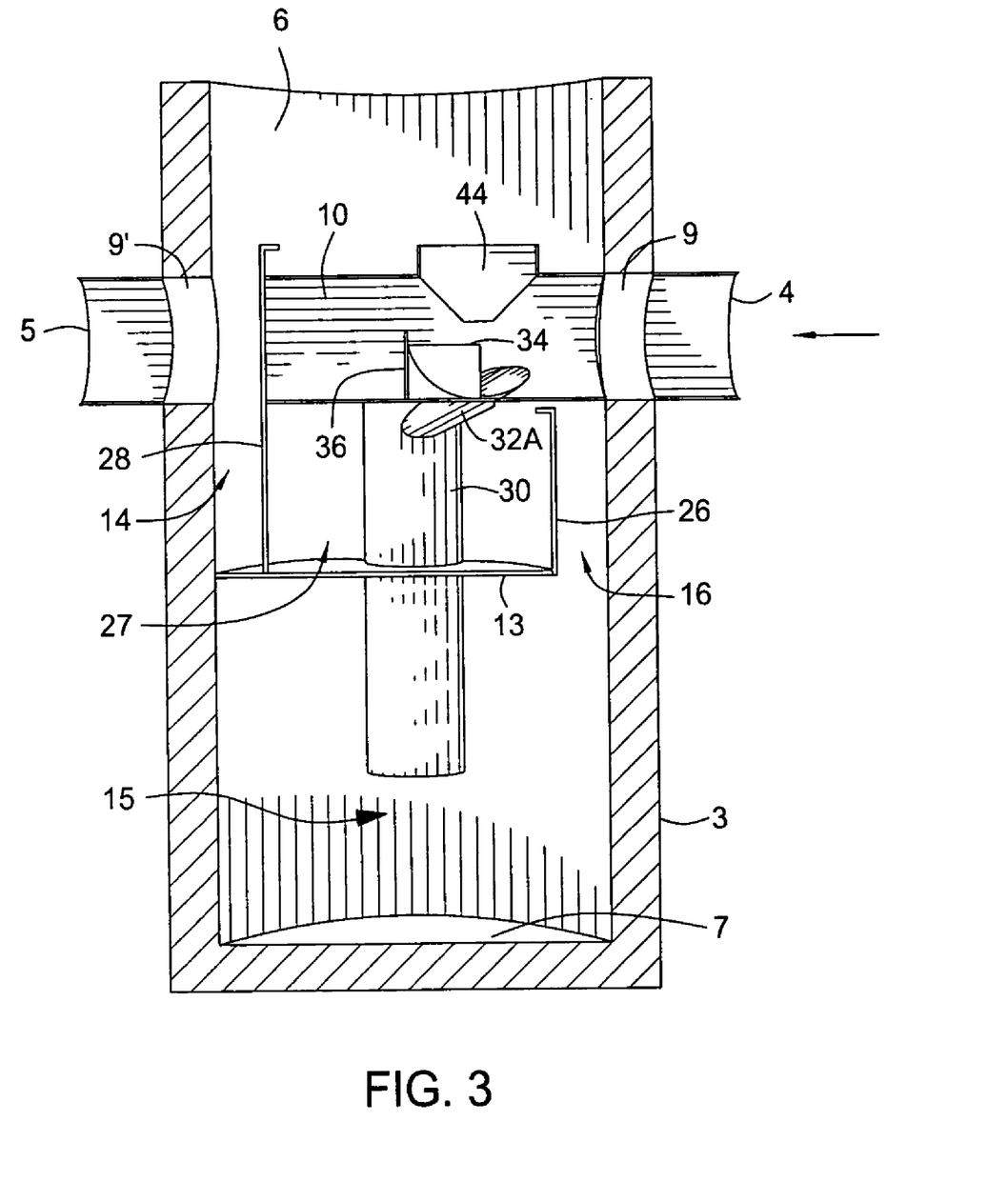
FIG. 3 is a sectioned side view of the assembly of FIG. 1, shown installed within a manhole.
Figure 4:
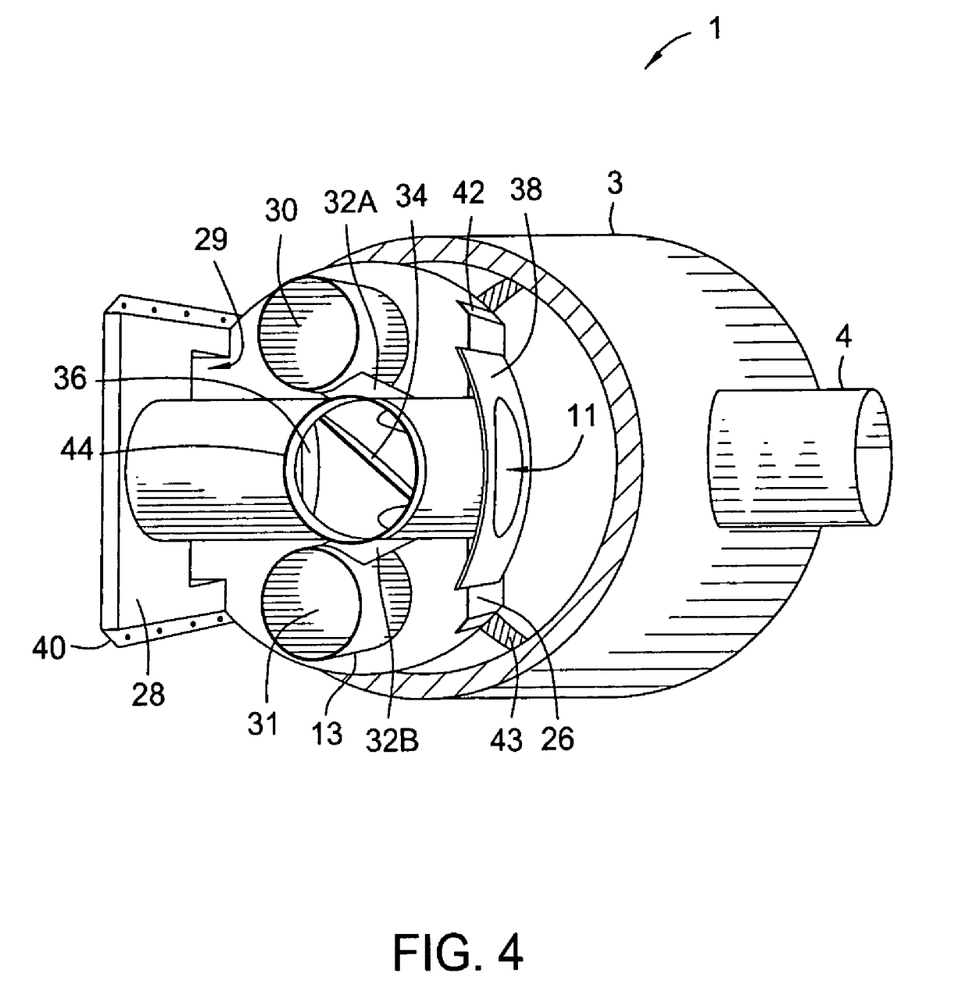
FIG. 4 is an exploded, three dimensional top view of the treatment assembly of FIG. 1.
Figure 5:
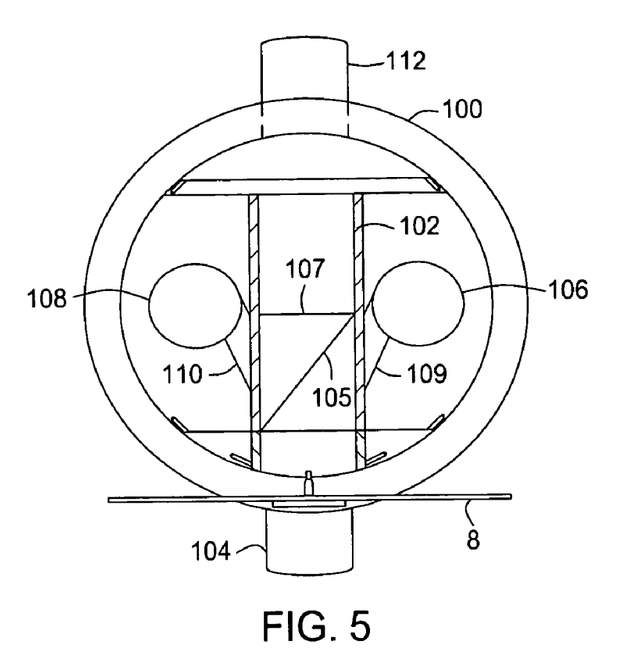
FIG. 5 is a top view of a treatment assembly shown positioned within a manhole employing an open-top bypass-chute member.
Figure 6:
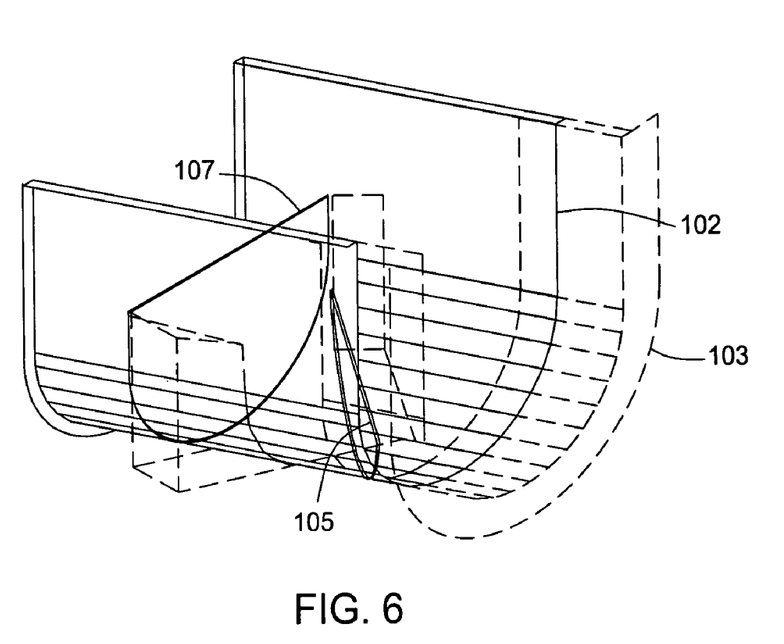
FIG. 6 is a three dimensional view of the open-top bypass chute member of FIG. 5.
Figure 7:
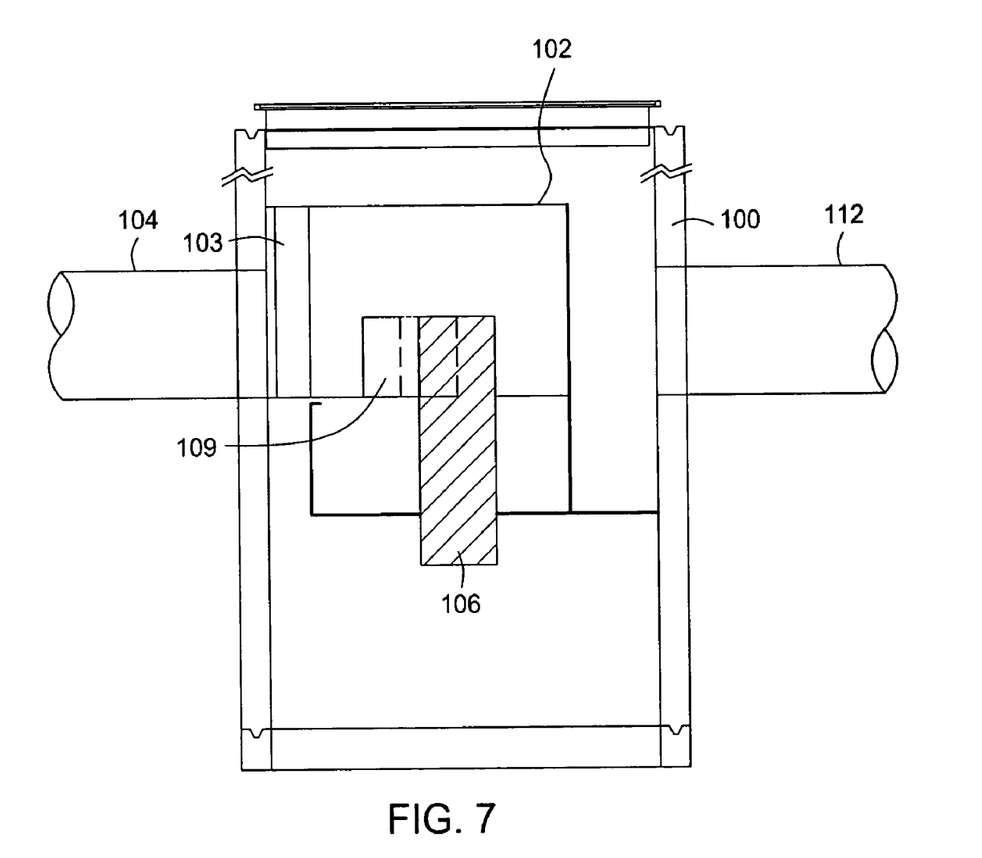
FIG. 7 is a side view of the treatment assembly of FIG. 5 shown positioned within a manhole.

An embodiment of the invention employing an open-top bypass chute in place of the through-pipe of FIGS. 1–4, is depicted in FIGS. 5–7. Referencing the figures, a manhole 100 is shown into which a treatment assembly has been inserted. Open top bypass chute 102 is provided (engaged by inner wall mounted receiving bracket 103, shown in dotted lines, FIG. 6) to receive water from inlet pipe 104 of manhole 100, and directs the flow of water towards first weir 105, which in turn diverts first flow to first hydrodynamic separator 106 through tangential delivery inlet 109. Water which overflows weir 105 is diverted by second weir 107 to hydrodynamic separator 108 through tangential delivery inlet 110. As with the first, through-pipe embodiment, the vortex separators herein extend through a support platform to access the lower portion of the manhole volume, and a series of outlet baffles are similarly used to direct the flow of water exiting the vortex separators to manhole outlet pipe 112.

The operation of the hydrodynamic separators is the same as that heretofore described in connection with the treatment assembly of FIGS. 1–4. By using the open chute illustrated in FIGS. 5 6, and 7, it can be readily appreciated that water entering the manhole from the inlet pipe is channeled to the weirs where it is diverted to the first and then the second vortex separator. Access for cleanout is simplified since the entire diverting structure is open and accessible to an operator servicing the system. As with the embodiment employing the through-pipe pass through member, the unit is easily removable to allow access to the lower portion of the manhole in connection with periodic maintenance and cleanout.

Figure 8:
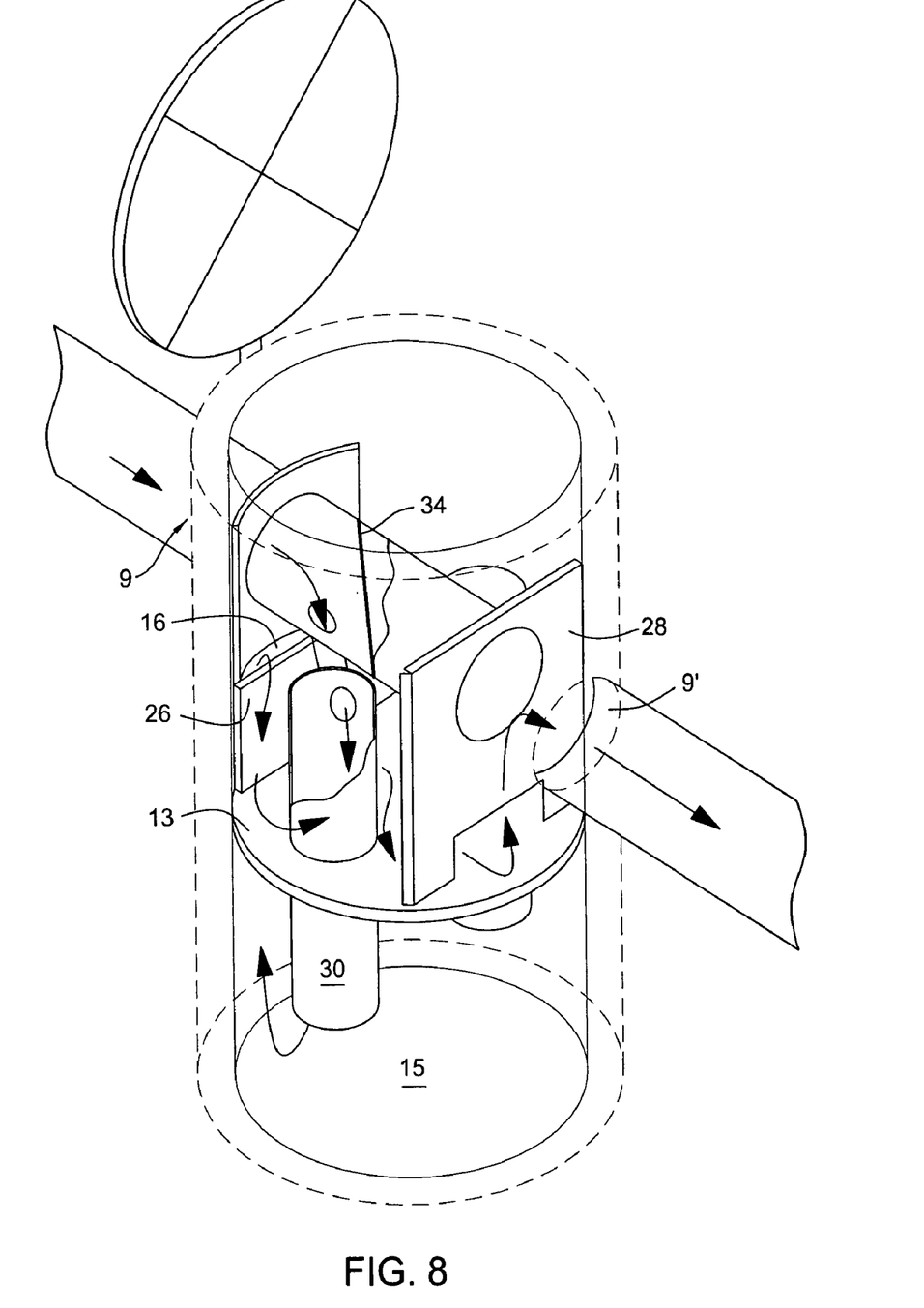
FIG. 8 is a three dimensional view of the treatment assembly of FIGS. 1–4 showing the path of stormwater during first stage flow.
Figure 9:
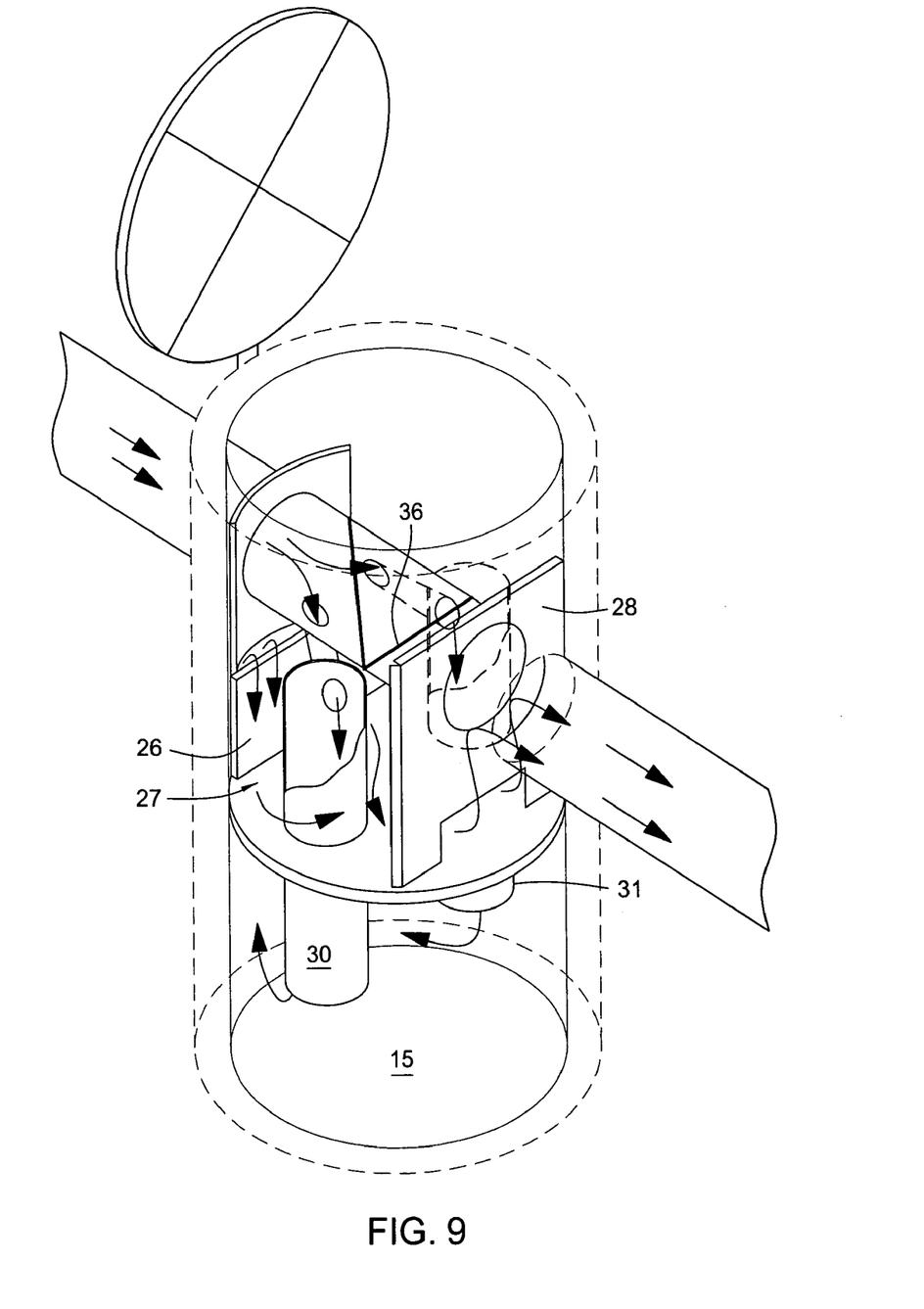
FIG. 9 is a three dimensional view of the treatment assembly of FIGS. 1–4 showing the path of stormwater during second stage flow.
Figure 10:
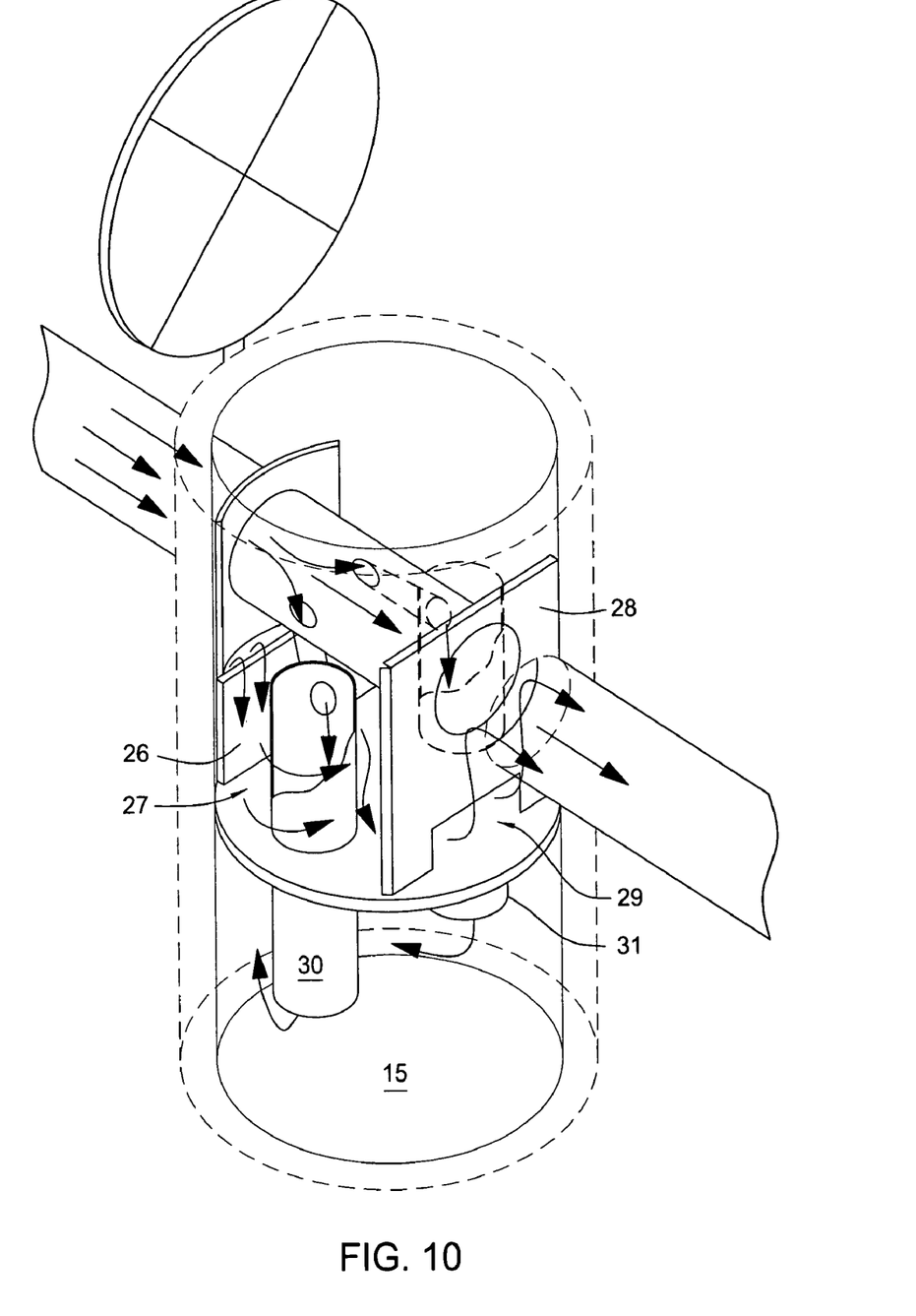
FIG. 10 is a three dimensional view of the treatment assembly of FIGS. 1–4 showing the path of stormwater during high, or bypass flow.

Various conditions of stormwater flow within the treatment assembly of this invention are illustrated in FIGS. 8, 9 and 10. Referring to FIG. 8, first stage or initial low flow is shown, with stormwater entering the manhole basin through drain inlet opening 9, and diverted by first weir 34 to vortex separator 30, as shown. Water in separator 30 is circulated downwardly along the perimeter wall towards reservoir 15. Hydrostatic forces direct the exited flow upwardly through the first forward opening 16 in central platform 13, over forward baffle 26 to exit at the base of retention baffle 28 via underflow opening 29, for discharge through outlet opening 9' into the continuation of the drainage system.

It is to be noted that an additional advantage of the design of the assembly of this invention is the added ability to contain floatable debris within the manhole, in storage compartment 27 between baffles 26 and 28. Thus, floating materials on the water's surface carried with initial storm water runoff are directed via through-pipe 10 and tangential inlet tubes 32A and 32B to the vortex separators, where they float to the top of the water column within the separators. As previously noted, as flows increase to a condition of bypass flow, these floatables will overflow the open tops of the vortex separators, where they are retained within compartment 27, the flow of fluid from the compartment exiting at the bottom thereof through underflow opening 29 for ultimate discharge.

In FIG. 9, increased flows overflow weir 34, said overflow diverted by second weir 36 to second vortex separator 31. This additional flow is similarly directed to the walls of that separator in a downwardly spiraling or corkscrew path to reservoir 15, where it eventually combines with flow from the first separator to exit the system via opening 16 and underflow opening 29 for discharge through outlet opening 9'.

Lastly, with reference to FIG. 10, a high flow condition is illustrated where the runoff volume exceeds the capacity of the separators and spills over the top of second weir 36, effectively bypassing both separators, and proceeds untreated into the free space on the outlet side of baffle 28 and then into the outlet drain pipe where it can be combined with the flows from other vortex separator treatment units prior to ultimate discharge into the environment. In the condition of high flow, a portion of the entering stream of water passes directly though the assembly via the high flow bypass, not disturbing sediments previously collected and residing in either the lower reservoir or upper storage zone of the manhole.

After a rain event, water in the system will drain to the level of the base of outlet opening 9'. With the base of tangential inlets 32A and 32B located above this low point, water in the pass-through member behind both the first and second weirs will likewise drain away to clear the pipe. Accumulated debris can easily be removed, in the case of through-pipe 10 though an access port 44 provided in the through-pipe, positioned to expose and provide direct access to weirs 34 and 36. Debris which has passed through the vortex separators will collect either at the bottom of the manhole, below platform 13, or be retained in compartment 27.

The dual vortex separator assembly of this invention can be constructed from a wide variety of materials. Given costs of construction and ease of fabrication, preferred materials include high-density polyethylene, plastic, fiberglass composites, and stainless steel. All of these materials afford strength, durability, and resistance to chemical attack. In an embodiment of this invention, fiberglass composite is the preferred material of choice for ease of fabrication. The manhole is into which the separator assembly of the invention is to be placed is usually constructed of reinforced concrete, and installed as part of initial drainage system construction. However, the manhole can be constructed of fiberglass or other materials as well, and the stormwater treatment system of this invention provided to a construction site as a completed vortex separator-manhole assembly.

In an alternative embodiment of this invention, at least one of the vortex separators can be replaced by a hydrocyclone unit, which units have the advantage of improved separation of smaller particles. The construction of such units, which is well known, generally comprises a closed vessel in the shape of an inverted cone. Fluids entering the unit are fed tangentially into the upper (larger diameter) portion where a rotary motion is imparted to the incoming liquid. The resulting spinning effect forces solids to the wall of the device to exit from the bottom (apex) of the cone. Clarified fluids move toward the central axis of the hydrocyclone where they are received by a centrally disposed passage, where they move up toward the outlet at the top of the vessel.

In one alternative embodiment, first flows are directed to a first vortex separator unit, with second stage flow directed to the hydrocyclone unit. As higher hydrostatic heads are typically required to effect separation in hydro cyclones, drainage systems into which these types of units are to be placed have to be designed with this greater hydrostatic head requirement in mind. For example, for a 4 foot manhole, a vertical displacement from inlet to outlet of about 18 inches is required to drive the hydrocyclone. As an additional consideration, hydrocyclones, with their smaller tangential chutes and capped configuration are more prone to becoming clogged with debris not removed upstream. Thus, they are best employed downstream, such as for second stage flow, where much of the debris will already have been removed.

In yet another alternative embodiment more than two vortex separators can be employed, the diameter of the separators reduced, consistent with the reduced maximum flow each will be required to handle. Thus, the two separators of the illustrated embodiment can be replaced by four separators of smaller diameter, the total treatable flow designed to equal the flow capacity of the two larger separators. In this embodiment, first flows can be directed by a first weir to the first two of the four separators, evenly splitting the flow for parallel treatment. The second, downstream weir can similarly direct second stage flow to the remaining pair of separators, likewise evenly splitting the flow for parallel treatment. As a still further alternative, the pass-through member can be provided with four weirs, each directing flow to one of the four vortex separators, with each successive weir taller than the preceding one to create a staged four level capability for treating stormwater. As with the two separator embodiment, one or more of the four vortex separators, preferably those downstream of the first and second separators can be replaced by a hydrocyclone separator.

The separator assembly of this invention provides a low cost option for treatment of stormwater. It is quick to install, and easily adaptable to be retrofitted into standard manholes. By providing for easy removal of the internal workings, full access to a manhole is afforded during periodic cleanout. By including a high flow bypass, high flow is separated from the rest of the chamber flow so as not to disturb previously retained materials.

While the foregoing is directed to embodiments of the present invention, other and further embodiments of the invention may be devised without departing from the basic scope thereof, the scope thereof to be determined by the claims that follow.

What is claimed is:

1. An assembly for treating stormwater, said assembly unit comprising:
    a pass-through member, having an inlet, an outlet and a longitudinal axis;
    a first vortex separator located between said inlet and outlet, said first vortex separator comprising a first hollow cylindrical wall open at both ends, and disposed orthogonally relative to the longitudinal axis of the pass-through member; said first wall comprising an inner surface and an outer surface;
    a first transport passageway in fluid communication with said pass-through member and said first vortex separator, the transport passageway disposed to direct stormwater flow tangentially to the inner surface of said first separator wall;
    a first weir positioned within said pass-through member downstream of said first transport passageway to direct low stormwater flow via said transport passageway to said vortex separator;
    a second vortex separator located between said inlet and outlet, said second vortex separator comprising a second hollow cylindrical wall open at both ends, and disposed orthogonally relative to the longitudinal axis of the pass-through member; said second wall comprising an inner surface and an outer surface;
    a second transport passageway in fluid communication with said pass-through member and said second vortex separator, said second transport passageway disposed to direct stormwater flow tangentially to the inner surface of said second separator wall; and
    a second weir downstream of both said first weir and said second transport passageway, said second weir larger than said first weir, to direct a high flow of stormwater via the second transport passageway to the second vortex separator.

2. The system of claim 1 wherein the pass-through member is a walled through-pipe.

3. The assembly of claim 2 wherein the cross sectional area of the opening defined by the crest of the second weir and the inner wall of the through-pipe is large enough to permit complete bypass of high flow through the assembly.

4. The assembly of claim 1 further including a platform spaced below the pass-through member, and through which the vortex separators extend, said platform defining an upper and lower region within a manhole into which the assembly has been placed.

5. The assembly of claim 1 wherein the pass-through member is an open chute.

6. The assembly of claim 1 wherein the components are provided as a modular construction, adapted to be releaseably secured within a manhole, and sized to be passed through the manhole cover so as to be removable for manhole cleanout.

7. The assembly of claim 1 wherein at least one of the vortex separators is a hydro-cyclone separator.

8. A system for treating stormwater run-off from one or more surface drains connected to a drain pipe, including:
    a basin positioned in line with said drainpipe to intercept fluid flow through said pipe prior to discharge, said basin having an inlet and an outlet in fluid communication with said drainpipe;
    a treatment unit disposed within said basin, said treatment unit including:

a pass-through member, having an inlet end and an outlet end;

a first vortex separator located between said inlet and outlet ends of said pass-through member, said first separator comprising a first hollow cylindrical wall, open at both ends; said first wall comprising an inner surface and an outer surface;

a first tangential delivery inlet in fluid communication with said pass-through member and said first vortex separator, said inlet aligned to direct stormwater fluid flow tangentially to the inner surface of said first separator wall;

a weir positioned within said drain pipe downstream of said first tangential delivery inlet to direct low stormwater run-off flow via said delivery inlet to sail vortex separator;

a second vortex separator located between said inlet and outlet ends of said pass-through member, said second separator comprising a second hollow cylindrical wall open at both ends;

a second tangential delivery inlet in fluid communication with said pass-through member and said second vortex separator, said delivery inlet aligned to direct stormwater run-off flow tangentially to the inner surface of said second separator wall; and a second weir downstream of both said first weir and said second tangential delivery inlet, said second weir larger than said first weir, to direct stormwater run-off flows spilling over the first weir to said second vortex separator.

9. The treatment system of claim 8 further including a third and forth vortex separator positioned between said inlet and outlet ends, said additional vortex separators in fluid communication with said pass-through member via tangential delivery inlets.

10. The treatment system of claim 9 wherein said vortex separators are positioned relative to said drain pipe so as to operate in pairs, whereby the first of said weirs directs a first portion of the fluid flow to the first pair of separators, and the second weir directs a second portion of the fluid flow to the second pair of separators.

11. The treatment system of claim 9 wherein each of said separators has associated with it a separate weir, each downstream weir taller than the one preceding, to define four stages of flow for separately directing fluid in turn to each of said separators.

12. The treatment system of claim 9 wherein at least one of the vortex separators is a hydrocyclone separator.

13. The treatment system of claim 8 wherein the pass-through member is a closed wall through-pipe.

14. The treatment system of claim 13 wherein the combined cross sectional area of the second weir and of the opening defined by the crest of the second weir and the wall of the through-pipe is at least as large as the cross sectional area of the drainpipe to which the basin is connected.

15. The treatment system of claim 8 wherein the pass-through member is n open top chute.

16. The treatment system of claim 8, further including a platform which separates the basin into a lower, retention zone, and an upper fluid passage zone, wherein the platform is truncated at one end to define, in combination with the walls of the basin, a crescent-like shaped opening between the edge of the platform and the basin walls, thereby providing a pathway for fluid exiting the vortex separators to enter the upper fluid passage zone prior to exiting the basin.

17. The treatment system of claim 16, further including a forward baffle positioned at the truncated edge of the platform, and a retention baffle positioned downstream of said forward baffle, said retention baffle having an underflow opening at its base to permit fluids entering the fluids passage zone to exit the basin by first flowing through said underflow opening.

18. A method for treating storm water runoff including the steps of:

providing a catch basin having an inlet and an outlet opening;

installing a treatment assembly within said catch basin, said treatment assembly including a pass-through member positioned in line with said inlet and outlet openings, said pass-through member including at least one diversionary weir downstream of a passageway in fluid communication at its one end with the pass-through member, and in tangential fluid communication with an inner wall of a vortex separator at its other end;

said treatment assembly further including a platform which separates the catch basin into a lower reservoir zone, and an open upper zone, said platform comprising an edge and truncated at its upstream end so as to define an opening between the wall of the catch basin and the edge of the truncated platform, said opening in fluid communication with the said lower and upper zones, said platform further including a forward baffle at its truncated end, and an opposing retention baffle near its downstream end to define in combination with the walls of the basin a storage compartment, the retention baffle further including an underflow opening at its base; and directing stormwater run off to said catch basin, whereby the storm water run off entering the basin is first diverted by said diversionary weir to the vortex separator, and then into the lower reservoir zone, the run off then passing through the opening at the truncated end of the platform to overflow the forward baffle into said storage compartment, the stormwater run off thereafter exiting the compartment through the underflow opening in the retention baffle, for exit from the basin.

* * * * *